United States Patent [19]

Topouzian et al.

[11] 4,197,363

[45] Apr. 8, 1980

[54] SEAL FOR SODIUM SULFUR BATTERY

[75] Inventors: Armenag Topouzian, Birmingham; Robert W. Minck, Lathrup Village; William J. Williams, Northville, all of Mich.

[73] Assignee: Ford Motor Company, Dearborn, Mich.

[21] Appl. No.: 954,967

[22] Filed: Oct. 26, 1978

[51] Int. Cl.² ............................................. H01M 2/00
[52] U.S. Cl. ................................... 429/104; 429/174; 429/185
[58] Field of Search ........................ 429/104, 101–103, 429/171, 172, 174, 185, 191, 31, 163, 164

[56] References Cited

U.S. PATENT DOCUMENTS

| | | | |
|---|---|---|---|
| 3,928,071 | 12/1975 | Thornton | 429/104 X |
| 3,939,007 | 2/1976 | Sudworth et al. | 429/104 X |
| 3,959,013 | 5/1976 | Breiter | 429/104 X |
| 4,024,321 | 5/1977 | Tilley | 429/104 |
| 4,048,391 | 9/1977 | Tilley et al. | 429/104 |
| 4,049,889 | 9/1977 | Heintz | 429/174 |
| 4,104,448 | 8/1978 | Gibson et al. | 429/104 X |
| 4,110,516 | 8/1978 | Breiter | 429/104 |

*Primary Examiner*—Anthony Skapars
*Attorney, Agent, or Firm*—William E. Johnson; Keith L. Zerschling

[57] ABSTRACT

This invention is directed to a seal for a sodium sulfur battery in which the sealing is accomplished by a radial compression seal made on a ceramic component of the battery which separates an anode compartment from a cathode compartment of the battery.

7 Claims, 2 Drawing Figures

SEAL FOR SODIUM SULFUR BATTERY

BACKGROUND OF THE INVENTION AND PRIOR ART STATEMENT

The invention herein described was made in the course of or under a contract or subcontract thereunder with the Department of Energy.

This invention is directed to a seal for a sodium sulfur battery in which the sealing is accomplished by a radial compression seal made on a ceramic component of the battery which separates an anode compartment from a cathode compartment of the battery.

A prior art search conducted on the subject matter of this application resulted in the citation of U.S. Pat. Nos. 3,928,071 and 3,939,007. We believe that these patents are not related to the subject matter of this application because they do not show a radial compression seal for such a battery of the nature that is disclosed herein. The U.S. Pat. No. 3,928,071 patent uses a glass seal 34 to contact the ceramic inner casing 11 and upon reading the rest of this specification one will immediately recognize that it is not analgous or similar in any manner to the seal to be shown herein. U.S. Pat. No. 3,939,007 has an alpha alumina flange 8 bonded to the inner tube 1 in a manner which also is not analgous or suggestive of the particular structure herein disclosed, as will be readily apparent upon reading of this specification. We are unaware of any other prior art which is relevant to the seal disclosed and claimed in this application.

SUMMARY OF THE INVENTION

This invention relates to a seal for a sodium sulfur battery and, more particularly, to an improved seal for sealing against a ceramic member which acts as a separator between an anodic compartment and a cathodic compartment of such a battery.

In accordance with the broad teachings of this invention, a soft metal seal member is held by a holding device against a surface of the ceramic member. A pressure applying device associated with the holding device applies pressure on the soft metal seal member while being held in its position adjacent the surface of the ceramic member thereby to deform the soft metal seal member into sealing association with the surface of the ceramic member and the holding device. If desired, the ceramic member against which the seal is made, can be the electrolyte material of the battery.

In accordance with a preferred embodiment the improved seal is used for sealing two compartments of the battery from one another. The two compartments are separated by a tube of ceramic material of circular cross section. The tube has an inner surface and an outer surface. In accordance with a preferred embodiment of this invention, the improved seal includes the following structure.

A cap device closes off the inner cross section of the tube. This cap device has a first portion which defines a surface in circumferential contact with the tube's inner surface. The first portion of the cap device also defines an inner circumferential notch adjacent the tube's inner surface.

An outer can member has an inner surface which encircles and is spaced from the tube's outer surface. A ring shaped element is bonded to the outer can member in a position between the tube's outer surface and the can member. The ring element has an inner circumferential surface adjacent the tube's outer surface. This association defines an outer circumferential notch between a portion of the tube's outer surface, a top surface of the ring element, and a portion of the inner surface of the can member.

A soft deformable inner ring element is received in the inner circumferential notch. A soft deformable outer ring element is received in the outer circumferential notch.

A first pressure applying device applies pressure on the inner ring element in the inner circumferential notch to deform the same into sealing contact with the tube's inner surface and the first portion of the cap device. A second pressure applying device applies pressure on the outer ring element in the outer circumferential notch to deform the same into sealing contact with the tube's outer surface and the inner surface of the outer can member thereby to provide a seal between two compartments of the sodium sulfur battery. If desired, the ceramic material may be the electrolyte of the battery.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in conjunction with the accompanying drawings wherein like reference characters indicate like parts throughout the several Figures, and in which:

DESCRIPTION OF A PREFERRED EMBODIMENT

Figures 1, 2:
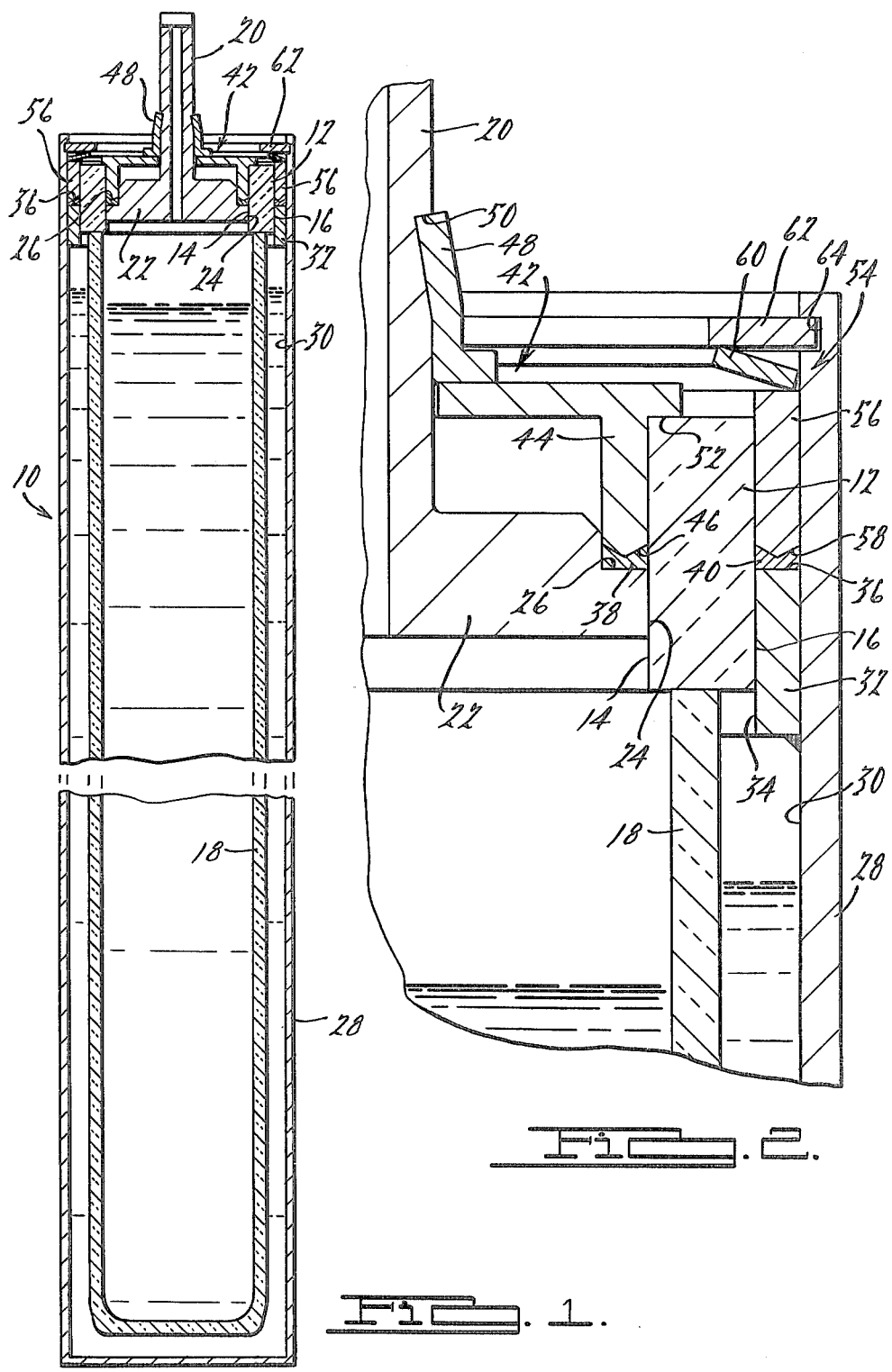
FIG. 1 is an elevation view, in cross section, of a sodium sulfur battery sealed by the seal of our invention.
FIG. 2 is an exploded view of one corner of the battery showing the sealing structure in larger dimensions.

The general principle of operation of a sodium sulfur battery is well known to those skilled in the art, as is evidenced by the great number of patents which have issued in this area. Therefore, no discussion will be undertaken herein of the theory and operation of such a battery.

Those skilled in the art know that it is necessary to seal the anodic compartment of the battery from the cathodic compartment of the battery so that the battery may carry out its intended function. Many different types of seals have been developed, as is evidenced by the number of patents which have issued this area. However, we are unaware of any sealing structures like or similar to the structure to be disclosed herein.

Also, for the sake of simplicity, only the general components of a sodium sulfur battery are shown in the drawings. Reference is now made to the drawings.

In FIG. 1 there is seen a hermetically sealed alkali metal battery designated generally by the numeral 10. This battery includes a ceramic ring 12 which has an inner surface 14 and an outer surface 16 associated therewith. The ceramic material may be formed from a material such as alpha alumina of high purity, such as 99.8%.

An inner casing 18 of a solid alkali ion-conductive material is in the form of a closed end tube. This casing is used as a reaction zone separator and will permit the transfer of ions of an anodic reactant therethrough to a cathodic reactant. The casing 18 is bonded at its open end to a bottom surface of the ceramic ring 12.

A cap 20 is provided for closing off the inner cross section of the ceramic ring 12. This cap has a first portion 22 thereof which defines a surface 24 which is positioned closely adjacent the inner surface 14 of the ceramic ring 12. The first portion 22 of the cap 20 also defines an inner circumferential notch 26, best seen in FIG. 2, adjacent the inner surface 14 of the ceramic ring 12.

An outer can member 28 has an inner surface 30 which encircles and is spaced from the outer surface 16 of the ceramic ring 12. A ring-shaped element 32 is bonded to the outer can member 28 in a position between the outer surface 16 of the ceramic ring 12 and the outer can member. An inner surface 34 of the ring-shaped element 32 is closely adjacent the outer surface 16 of the ceramic ring 12. In this manner, an outer circumferential notch 36 is defined by a portion of the outer surface 16 of the ceramic ring 12, a top surface of the ring-shaped element 32 and a portion of the inner surface 30 of the outer can member 28.

A soft deformable inner ring element 38 made of the material such as aluminum is received in the inner circumferential notch 26. In a like manner, an outer ring element 40 of a soft deformable material such as aluminum is received in the outer circumferential notch 36. These ring elements are best seen in FIG. 2.

A first pressure applying device generally identified by the numeral 42 is used to apply pressure to the inner ring element 38 in the following manner. The pressure applying device includes a pressure applying element 44 having a pressure applying surface 46 thereon which is received in the inner circumferential notch 26. Pressure is generated on the pressure applying surface by means of a locking element 48 of the pressure applying device 42. This locking element is received in an indentation 50 formed in an upwardly projecting portion of the cap 20.

The manner in which the pressure is applied on the inner ring element 38 is as follows. Such an inner ring element would be placed in the inner circumferential notch 26 formed in the first portion 22 of the cap 20. Thereafter, the pressure applying device 42 would be assembled by having the locking element 48 thereof slid downwardly over the upstanding portion of the tube 20 until such time as the locking element 48 is received in and locked to the indentation 50 in the cap 20. The relative movement between the pressure applying device 42 and the cap 20 in order to achieve the locking action will insure that sufficient pressure is applied by the pressure applying surface 46 of the pressure applying element 44. This pressure deforms the inner ring element 38 into sealing contact with the inner surface 14 of the ceramic ring 12 and the first portion 22 of the cap 20.

A shoulder 52, formed on the pressure applying element 44, engages the ceramic ring 12 in order to position and locate the point at which the inner ring element 38 will be sealed against the inner surface 14 of the ceramic ring 12 and the first portion 22 of the cap 20.

The outer ring element, which is normally sealed first, is sealed by a second pressure applying device generally designated by the numeral 54. This second pressure applying device 54 includes a pressure applying element 56 with a pressure applying surface 58 thereon, (FIG. 2). The pressure applying surface 58 of the pressure applying element 56 is received in the outer circumferential notch 36. A Belleville type spring 60 forms a part of the second pressure applying device 54. This spring 60 contacts a top surface of the pressure applying element 56. A snap ring 62 also forms a portion of the second pressure applying device 54. The snap ring 62 is received and retained by an opening 64 in the outer can member 28.

The deformation of the outer ring element 40 takes place as follows. The pressure applying element 56 is inserted into the outer circumferential notch 36 so that the pressure applying surface 58 thereof is in contact with the outer ring element 40. The Belleville spring 60 is then placed on top of the pressure applying element 56 and the snap ring 62 is brought into engagement with the Belleville spring 60 and moved downwardly thereagainst until it snaps into the opening 64. This action causes sufficient pressure to be generated to deform the outer ring element 40 into sealing contact with the outer surface 16 of the ceramic ring 12 and the inner wall 30 of the outer can member 28. In such a manner, a seal is achieved between the two compartments of the sodium sulfur battery.

In accordance with other teachings of various embodiments of the apparatus herein involved, a single seal may be made on either the inner or outer side of the ceramic material in accordance with the type of structure disclosed herein, and a different type of sealing arrangement used in association with the other surface to effect a seal.

As shown in the preferred embodiment, the seals are opposed to one another. We feel that this is the best arrangement when seals of the type disclosed herein are used on both sides of the ceramic material. However, the seals may be offset one from another if so desired. As an additional advantage, if one desires, they may seal directly to the ceramic material which forms the electrolyte of the battery.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In a sodium sulfur battery an improved seal for sealing against a ceramic member which acts as a separator between an anodic compartment and a cathodic compartment, which improved seal comprises:
   a soft metal seal member;
   holding means for holding said soft metal seal member adjacent a surface of the ceramic member; and
   pressure applying means associated with said holding means for applying pressure on said soft metal seal member while being held by said holding means thereby to deform said soft metal seal members into sealing association with the surface of the ceramic member and a surface of said holding means.

2. The seal of claim 1, wherein the ceramic material is the electrolyte material of the sodium sulfur battery.

3. In a sodium sulfur battery an improved seal for sealing two compartments from one another, the two compartments being separated by a tube of ceramic material of circular cross section having an inner surface and an outer surface, said seal comprising:
   cap means for closing off the inner cross section of the tube, said cap means having a first protion thereof defining a surface positioned closely adjacent the tube's inner surface, the said first portion also defining an inner circumferential notch adjacent the tube's inner surface;

an outer can member having an inner surface encircling and spaced from the tube's outer surface;

a ring-shaped element bonded to said outer can member in the position between the tube's outer surface and said can member, said ring element having an inner circumferential surface positioned closely adjacent the tube's outer surface whereby an outer circumferential notch is defined by (a) a portion of the tube's outer surface, (b) a top surface of said ring element, and (c) a portion of said inner surface of said can member;

a soft deformable inner ring element received in said inner circumferential notch;

a soft deformable outer ring element received in said outer circumferential notch;

first pressure applying means for applying pressure on said inner ring element in said inner circumferential notch to deform the same into sealing contact with the tube's inner surface and said first portion of said cap means; and second pressure applying means for applying pressure on said outer ring element in said outer circumferential notch to deform the same into sealing contact with the tube's outer surface and said inner surface of said outer can member thereby to provide a seal between two compartments of the sodium sulfur battery.

4. The improved seal for a sodium sulfur battery as defined in claim 3, wherein:

said inner circumferential notch and said outer circumferential notch are aligned with one another so that said inner ring element and said outer ring element are deformed, in part, radially toward one another in forming the seal between two compartments of the battery.

5. The improved seal of claims 3 or 4, wherein said first pressure applying means includes a pressure applying element received in said inner circumferential notch to apply pressure on said inner ring element.

6. The improved seal of claim 5, wherein said second pressure applying means includes a pressure applying element received in said second circumferential notch to apply pressure to said outer ring element.

7. The improved seal of claim 1, wherein: the ceramic material is the electrolyte of the battery.

* * * * *